United States Patent
Giese et al.

[11] 3,938,632
[45] Feb. 17, 1976

[54] OVERRUNNING CLUTCH

[75] Inventors: Emil Giese; Ruprecht Maurer, both of Bad Homburg vor der Hohe, Germany

[73] Assignee: Ringspann Albrecht Maurer K.G., Bad Homburg vor der Hohe, Germany

[22] Filed: Jan. 22, 1975

[21] Appl. No.: 542,892

[30] Foreign Application Priority Data
Jan. 23, 1974  Germany.......................... 2403071

[52] U.S. Cl................................ 192/41 A; 192/45.1
[51] Int. Cl.².......................................... F16D 41/07
[58] Field of Search....................... 192/41 A, 45.1

[56] References Cited
UNITED STATES PATENTS
3,702,649  11/1972  Giese et al. ....................... 192/41 A FOREIGN PATENTS OR APPLICATIONS
915,872  7/1946  France................................ 192/41 A
1,264,886  4/1966  Germany........................... 192/41 A

*Primary Examiner*—Allan D. Hermann
*Attorney, Agent, or Firm*—Spencer & Kaye

[57] ABSTRACT

A combination of a sprag clutch and a deep-groove ball bearing has a cage ring made of two identical radial halves. Each cage ring half has circumferentially spaced first recesses each accommodating and pivotally supporting a spring-biased sprag; circumferentially spaced alternating pockets for captively holding a bearing ball; and second recesses each nestingly receiving a bearing ball. The number of pockets and the number of second recesses in each cage ring half each equals one half the number of bearing balls in the ball bearing. The two cage ring halves are staggered with respect to one another to the extent of one bearing ball pitch, so that with any pocket on either cage ring half there is axially aligned a second recess in the other cage ring half.

13 Claims, 6 Drawing Figures

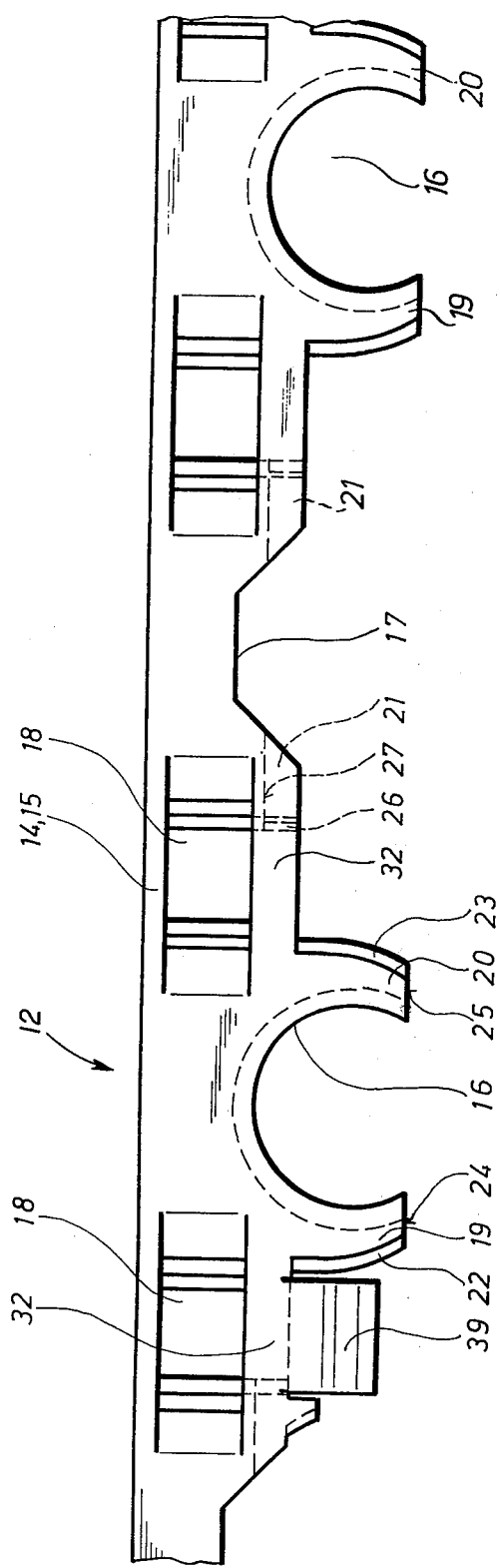

OVERRUNNING CLUTCH

BACKGROUND OF THE INVENTION

The invention relates to the combination of an overrunning clutch of the sprag type with a deep-groove ball bearing.

German Pat. No. 1,264,886 discloses an overrunning clutch in which the balls and sprags are arranged alternately between a common inner race and an outer race. The balls may run in a raceway in alignment with the common central radial plane of the races and the individual sprags which are spring-biased in the direction of engagement and are pivotable about axes extending parallel to the bearing axis, are disposed between the balls in pairs to cooperate with the remaining race shoulders on both sides of the ball raceway. The sprags and balls have a common cage ring comprising two radial halves which adjoin each other in the region of the radial running plane of the balls. The two inward-facing axial faces of the cage ring halves are provided with pockets for the balls and the two outward-facing axial faces are provided with pockets for the sprags. The last-mentioned pockets are closed at the end of the assembling operation by the fitting of circular cover discs.

The above-outlined construction therefore calls for the manufacture and storage of three different components for making the cage ring, because, although the cover discs are identical, the two above-mentioned cage ring halves cannot be identical, since the spring biasing of the sprags calls for compression springs which must be differently arranged in the two cage ring halves. Furthermore, the use of compression springs for the sprags has the disadvantage that due to manufacturing tolerances, the springs may apply widely differing biasing forces to the sprags. This, in turn, may lead to a non-uniform operation of the sprags and thus, to an irregular loading of the overrunning clutch along its circumference.

Although the two cage ring halves and their cover discs are centered with respect to each other by recesses and studs on their boundary surfaces, the retention of the parts, however, can be ensured only by welding or adhesively bonding them together. This calls for exceptional skill in the assembly and therefore, this is an operation which can be performed only by reliable skilled personnel; a fact which has a noticeable effect on the prime costs. Furthermore, it is not possible to dismantle the known cage ring without destruction, for example, for the purpose of testing the operability of the overrunning clutch or the ball bearing.

SUMMARY OF THE INVENTION

It is an object of the invention to provide a cage ring for the sprag clutch-ball bearing combination of the general kind dedescribed hereinbefore which requires only a minimum of individual components for manufacture and stock-keeping, which can be easily assembled without special skill, which is particularly suited for automatic or mechanized assembly, which can be dismantled without difficulty or the risk of destruction and therefore provides increased efficiency due to the reduction in expenditure for material and assembly.

These objects and others to become apparent as the specification progresses, are accomplished by the invention, according to which, briefly stated, a combination of a sprag clutch and a deep-groove ball bearing has a cage ring made of two identical radial halves. Each cage ring halves has circumferentially spaced first recesses each accommodating and pivotally supporting a spring-biased sprag; circumferentially spaced, alternating pockets for captively holding a bearing ball; and second recesses each nestingly receiving a bearing ball. The number of pockets and the number of second recesses in each cage ring half each equals one half the number of bearing balls in the ball bearing. The two cage ring halves are staggered with respect to one another to the extent of one bearing ball pitch, so that with any pocket on either cage ring half there is axially aligned a second recess in the other cage ring half.

Thus, the cage ring structured according to the invention calls for the production and stock-keeping of only a single component so that prime costs, more particularly the costs for making the necessary tools, are greatly reduced. Furthermore, for the assembly operation it is merely necessary to press the two cage ring halves, usually pre-fitted with the sprags and their individual springs, into the deep-groove ball bearing. Then, the locking engagement of the jaw-shaped ball pockets ensures a firm seating as well as the required centering of the cage ring is sufficient clearance is provided between the balls and their pockets. The fulfillment of this condition does not give rise to any difficulties in manufacture.

If subsequent inspection of the sprag clutch or the ball bearing is desirable in order to check the operability thereof, the cage ring may be dismantled in a same simple manner without destructing any parts or without the need of replacing any component.

It has been found advantageous to so construct the recesses for the balls that the recesses surround the outside of the free ends of the jaw members associated therewith. It is also advantageous if the end faces of the free ends of the jaw members abut axially on mating surfaces of recesses associated therewith and the external contour of each jaw is spherical. This substantially assists centering between the two cage ring halves or provides self-centering so that the tolerance between the balls and their pockets can be increased or, as the case may be, there will be no need for special manufacturing accuracy.

It is also advantageous to dispose the individual springs on the open side of the recesses adjacent to the sprags and to design them as coil springs with a support arm secured on the cage ring, and a load arm adapted to act on the appropriate sprag and located in a sprag notch which is open substantially in the circumferential direction and which extends axially, adjacent to the radially inner locking surface of the sprag. Preferably, the support arm of the coil spring secured on the cage ring is anchored in a slit which extends in the circumferential direction of the adjacent wall that forms a recess for a ball. For effecting such anchoring, the slit may be, for example, deformed after the support arm is positioned in the slit.

As a result of these steps, the individual springs are disposed in the otherwise unused axial region of the ball grooves between the balls. Furthermore, with the exception of the relatively easy provision of the slits, the arrangement of the individual springs does not call for any special structural measure regarding the cage rings. Finally, the individual springs and the sprags are captively retained in a known manner in the cage ring halves even when these are dismantled, so that the cage ring halves can be easily prepared during manufacture without the risk of losing parts, by first securing the coil springs and thereafter inserting the sprags in their recesses. Cage ring halves prepared in this way can be easily stored.

The wall parts which define the recesses for the sprags in the circumferential direction are preferably radially and externally connected to each other by means of a web which extends circumferentially directly adjacent to the associated sprag. Preferably, the axial position of the web is substantially within the axial zone occupied by the ball groove of the outer race. This, on the one hand, provides additional axial securing or contact surface for the sprags and, on the other hand, provides radial support for the coil springs, without affecting the sprags, against the centrifugal forces exerted by the coil springs. Furthermore, the stiffness of the cage ring is substantially improved, so that the afore-mentioned smooth, continuous wall can be extremely thin and practically the entire width of the annular surfaces adjacent to the ball raceway of the inner race and outer race is made available for the sprags.

The inward-facing end faces of the cage ring halves may expediently be provided with means for effecting a detachable, snap-in, mutual axial and radial connection. For this purpose, the earlier-mentioned pins and recesses on each side can advantageously be used; they can be formed, for example, on the one hand, on the free ends of the jaw members and, on the other hand, on the oppositely disposed wall parts which define the recesses for the balls.

It has been found to be particularly advantageous if a lug on at least two diametrically opposite webs of each cage ring half projects axially into the region occupied by the ball groove of the outer race and engages therein a corresponding lug of the opposite cage ring half. For example, one lug in each cage ring may be designed as a barbed hook which is open radially outwardly and the other lug is designed as a barbed hook which is open radially inwardly. Associated lugs of the cage ring halves engage one another by means of their barbed hooks. In order to facilitate assembly, it is advantageous to provide the cage ring halves on both side faces with markings which are offset with respect to each other by 180°.

For automatic, i.e. mechanized assembly, it is also advantageous to construct the sprags in rotationally symmetrical form so that the position in which they are fed to the location of assembly is immaterial.

The terms "circumferential", "axial" and "radial" as used here, are orientations related to the entire ball bearing-sprag clutch combination.

BRIEF DESCRIPTION OF THE DRAWINGS

FIG. 3 is a fragmentary radial external view of one cage ring half in developed form.

DESCRIPTION OF THE PREFERRED EMBODIMENT

Figure 1:
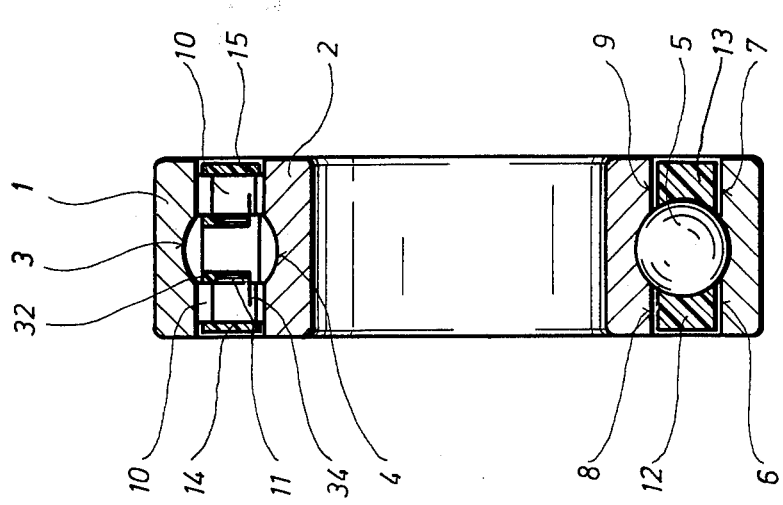
FIG. 1 is an axial sectional view of a preferred embodiment of the invention.

In FIG. 1 there is shown a deep-groove ball bearing which comprises an outer race 1 and an inner race 2 between which an even number of balls 5 run in grooves 3 and 4 provided in races 1 and 2, respectively. The ring shoulders 6, 7 and 8, 9 adjacent to the balls 5 on the rings 1 and 2 cooperate with the sprags 10 of a sprag clutch. Each sprag 10 is pivotable and is urged against the ring shoulders 6 to 9 by means of a separate coil spring 11. Balls 5, sprags 10 and springs 11 have a common cage comprising two identical cage ring halves 12 and 13 preferably made of a synthetic material by injection molding.

Figure 2:
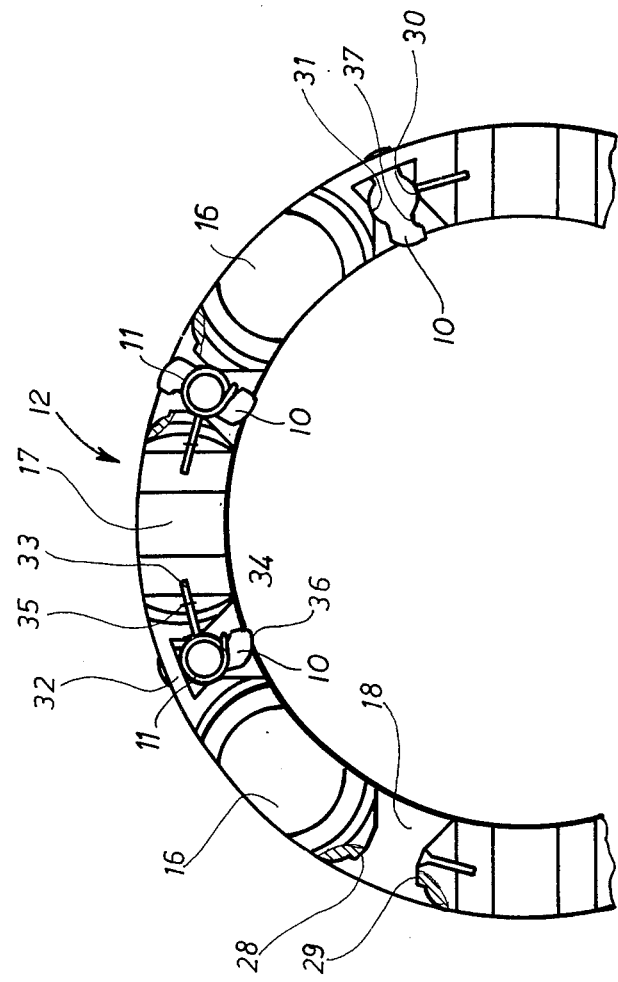
FIG. 2 is a fragmentary plan view of the inside of one cage ring half forming part of the preferred embodiment.
Figure 3A:
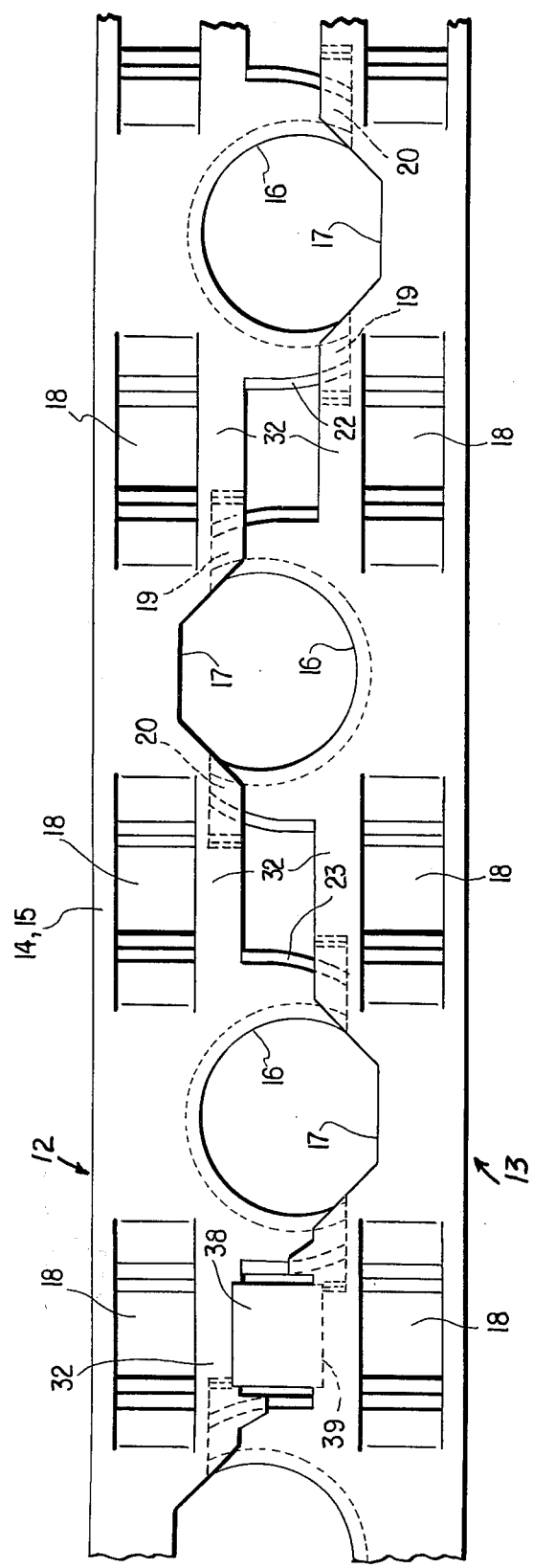
FIG. 3a is a fragmentary radial external view of two interfitting cage ring halves in developed form.
Figure 4:
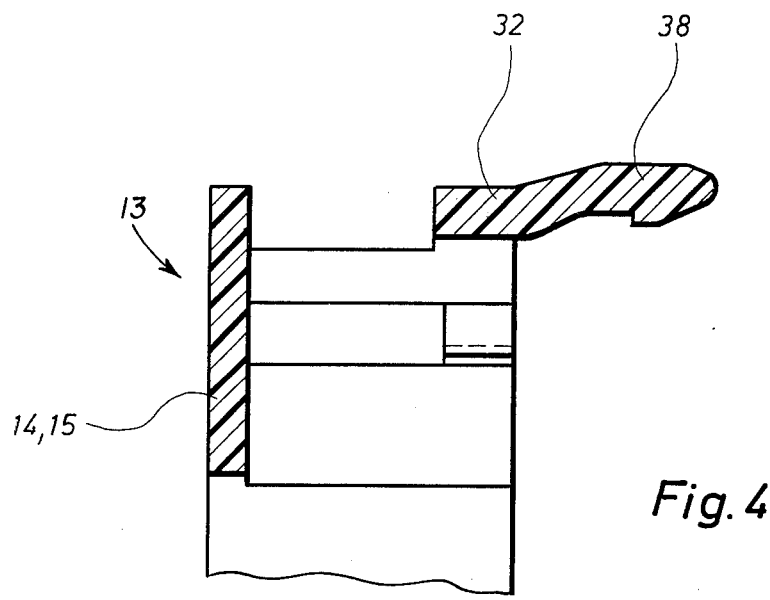
FIGS. 4 and 5 are fragmentary radial sectional views of a cage ring half at an enlarged scale.
Figure 5:
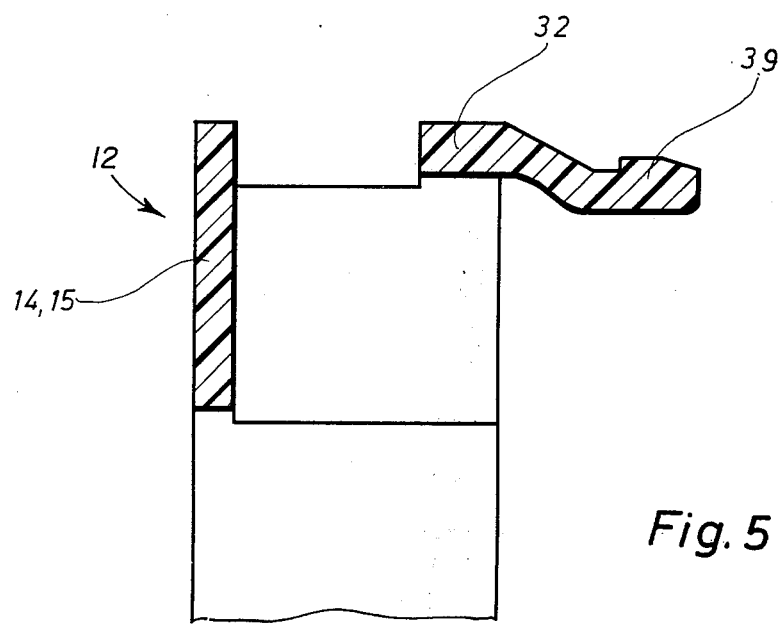

Also referring now to FIGS. 2 and 3, each cage ring half has a smooth, continuous and relatively thin outer wall 14 or 15, respectively, and is provided with pockets 16 for every other ball 5 and recesses 17 for the intervening balls. A recess 18 for a sprag 10 and its coil spring 11 is provided between each pocket 16 and each adjacent recess 17.

As it can be best seen by considering together FIGS. 2 and 3, each pocket 16, the internal contour of which corresponds to that of a ball 5, is formed of jaws 19 and 20 which surround the ball 5 in the axial direction, over more than half the extent of the circumference of the ball, so that a snap-in engagement may be established between the balls 5 and the pockets 16. The shape of the recesses 17 can be selected as desired, provided steps are taken to ensure that the balls received therein have sufficient freedom of movement.

The two cage ring halves 12 and 13 are offset by one ball pitch with respect to each other when being assembled, so that each pocket 16 of one cage ring half is situated opposite a recess 17 of the other cage ring half. In order to center the cage ring halves additionally with respect to each other in the radial and peripheral directions, the recesses 17 which accurately match the external contours of the jaws, have on both sides indentations 21 for the free ends of the jaws 19 and 20. Since the exterior surfaces 22 and 23 of the jaws 19 and 20 in the illustrated example are spherical and the jaws have plane end faces 24 and 25, the indentations 21 have corresponding concave side walls 26 and plane abutment surfaces 27. The cooperation between the interfitting ring halves 12 and 13 may be well observed in FIG. 3a.

The recesses 18 for the sprags 10 have generally convex guide surfaces 28 and 29 adjoining the sprags in the peripheral direction; the sprags are thus able to roll on these surfaces with their likewise convex external surfaces 30 and 31. Furthermore, the recesses 18 are formed in a known manner so that they permit the sprags to tilt between the freewheeling and coupling states; specifically, the recesses are flared in the radial direction both inwardly and outwardly.

The recesses 18 are radially externally bounded on the inside of the cage ring halves by webs 32, which are omitted in some instances in FIG. 2 for the sake of clarity. As it may be best seen in FIG. 1, each web 32 is situated axially in the region of the groove 3, i.e. adjacent to the ring shoulder 6, so that it does not reduce the sprag width otherwise permitted by the width of the shoulder 6. On the other hand, the web 32 guides the sprags 10 in the axial direction and supports the coil springs 11 in the radial direction against the effect of centrifugal forces, so that the latter cannot affect the sprags in a manner which would impair their function. Further, the web 32 substantially increases the rigidity of the cage ring halves, more particularly in the region of the recesses 18.

As may be seen in FIGS. 1 and 2, the coil springs 11 are disposed on the inwardly oriented side of the sprags 10 and are thus also situated in the region of the ball groove 3, so that they do not reduce the maximum possible width of the sprags 10. Each coil spring is provided with a support arm 33 and a load arm 34. The support arm 33 is sunk into a substantially circumferentially oriented slit provided in the wall parts forming the recess 17. The slit is, for example, deformed at 35, so that the support arm 33 and thus the coil spring 11 is captively located (anchored). The load arm is situated in a notch 37 of the sprag 10. The notch 37 extends axially, adjacent to the inner clamping surface 36 of the sprag and is open in the circumferential direction. The coil springs and sprags are thus captively retained in their cage ring half, because the sprags are secured in the circumferential direction by the guide surfaces 28 and 29 and in the radial direction by the load arm 34 of each coil spring. The sprags are reversible, to facilitate assembly.

As it may be seen in FIGS. 3, 3a, 4 and 5, the cage ring halves may be provided with additional means for the relative radial and axial positioning. To this end, it has been found advantageous to provide two diametrically opposite webs 32 of each cage ring half with lugs 38 and 39 which extend into the axial region occupied by the ball groove 3, and of which the lug 38 is formed as a radially inwardly open barbed hook and the lug 39 is formed as a radially outwardly open barbed hook. If the two cage ring halves are inserted into each other with an offset of 180° with respect to the lugs 38 and 39, one lug 38 of one cage ring half and one lug 39 of the other cage ring half will interengage. Markings offset by 180° may be placed on the cage ring halves to facilitate interengagement of the two halves at the correct position.

It will be understood that the above description of the present invention is susceptible to various modifications, changes and adaptations, and the same are intended to be comprehended within the meaning and range of equivalents of the appended claims.

We claim:

1. In a combination of a sprag clutch with a deep-groove ball bearing having inner and outer races having circumferential grooves and axial shoulders defining a raceway; a plurality of bearing balls disposed in the raceway in alignment with the common central radial plane of the races; a plurality of sprags disposed in pairs in the raceway, the sprags of each sprag pair being situated axially adjacent on one and the other side of the raceway occupied by the bearing balls; the bearing balls and the sprag pairs being arranged alterately in the circumferential direction; spring means for urging each sprag into coupling engagement with the race shoulders; and a cage ring disposed in the raceway for supporting the balls and the sprags and maintaining a spacing therebetween; the improvement comprising two identical radial cage ring halves abutting one another in and along the zone of said radial running plane to constitute said cage ring; each cage ring half having:

a. a continuous circumferential terminal wall disposed spaced from the abutting faces of the two cage ring halves, said terminal wall having an outer face constituting the outer radial edge face of said cage ring half;

b. means defining a plurality of circumferentially spaced first recesses, each receiving and pivotally supporting a sprag and its associated spring means;

c. means defining a plurality of circumferentially spaced pockets, each receiving a bearing ball; the number of said pockets being one half the number of said bearing balls; each pocket being formed as a jaw surrounding the associated bearing ball over more than one half of its circumference; and d. means defining a plurality of circumferentially spaced second recesses, each receiving a bearing ball; the number of said second recesses being one half the number of said bearing balls; said pockets and said second recesses being arranged alternately;

the two identical cage ring halves being staggered with respect to one another by the extent of one ball pitch, whereby with each said pocket provided on either cage ring half there is axially aligned one of said second recesses in the other cage ring half.

2. A combination as defined in claim 1, each said jaw having two spaced free ends; each said second recess externally surrounding the free ends of the associated jaw.

3. A combination as defined in claim 2, each free jaw end having an axial edge face; each second recess being flanked by axial abutment surfaces; the edge faces of each jaw being in a face-to-face contact with the abutment surfaces flanking the associated second recess.

4. A combination as defined in claim 1, wherein the outer contour of each said jaw has a spherical configuration.

5. A combination as defined in claim 1, each said first recess having a radially outwardly oriented open side; each sprag having a radially inwardly and a radially outwardly oriented coupling face to cooperate with the shoulder of said inner and outer races, respectively; each sprag further having a notch being open in the circumferential direction and extending axially, adjacent said radially inwardly oriented coupling face; each said spring means being constituted by a coil spring at said open side adjacent the associated sprag; each coil spring having a support arm held on said cage ring and a load arm situated in the notch of the associated sprag.

6. A combination as defined in claim 5, further comprising means defining a slit provided in each cage ring half adjacent each said second recess, each said slit extending substantially in a circumferential direction; said support arm of an adjacent coil spring being anchored in each said slit.

7. A combination as defined in claim 1, wherein wall portions of each cage ring half that bound said first recesses in the circumferential direction are interconnected at radially outwardly oriented locations by a web extending in the circumferential direction immediately adjacent the associated sprag; the axial position of said web being within the axial zone occupied by said groove of said outer race.

8. A combination as defined in claim 1, said cage ring halves having, on their axial edge faces oriented towards one another, means for releasably locking said cage ring halves to one another in an axial and radial alignment.

9. A combination as defined in claim 7, wherein at least two diametrically opposite and axially adjacent webs in the one and the other cage ring half are provided with a separate lug extending axially into the zone occupied by the groove of said outer race, aligned lugs of the one and the other cage ring half being in an interlocking relationship with one another.

10. A combination as defined in claim 9, wherein cooperating lugs of the one and the other cage ring half are constituted by radially outwardly and radially inwardly oriented hooks being in interlocking engagement with one another.

11. A combination as defined in claim 9, wherein each cage ring half is provided with a marking; the marking on one of said cage ring halves is offset 180° with the marking on the other said cage ring halves.

12. A combination as defined in claim 1, wherein said sprags are rotationally symmetrical.

13. A combination as defined in claim 1, wherein said cage ring halves are made of a synthetic material.

* * * * *